United States Patent [19]

Thebault

[11] 4,410,257

[45] Oct. 18, 1983

[54] APPARATUS FOR DEVELOPING FILMS HAVING A PIVOTABLE ARM

[75] Inventor: Claude Thebault, Meylan, France

[73] Assignee: Kis France, Grenoble, France

[21] Appl. No.: 362,122

[22] Filed: Mar. 26, 1982

[30] Foreign Application Priority Data

Apr. 3, 1981 [FR] France ............................... 81 06899

[51] Int. Cl.[3] ............................................ G03B 3/08

[52] U.S. Cl. ...................... 354/308; 354/313;316;322

[58] Field of Search ............... 354/316, 320, 322, 329, 354/330, 312, 308, 313

[56] References Cited

U.S. PATENT DOCUMENTS

| | | | |
|---|---|---|---|
| 1,794,996 | 3/1931 | Waldron | 354/308 |
| 2,544,644 | 3/1951 | Allen | 354/322 |
| 2,975,695 | 3/1961 | Tsuno | 354/316 |
| 3,443,503 | 5/1969 | Holm et al. | 354/316 |
| 3,494,273 | 2/1970 | Kampf et al. | 354/322 |
| 4,011,573 | 3/1977 | Braico | 354/329 |

FOREIGN PATENT DOCUMENTS

| | | | |
|---|---|---|---|
| 1193668 | of 0000 | France . | |
| 1483153 | of 0000 | France . | |
| 600505 | 3/1978 | U.S.S.R. | 354/316 |
| 660011 | 4/1979 | U.S.S.R. | 354/322 |

OTHER PUBLICATIONS

Journal of Applied Spectroscopy, vol. 18, No. 1, 1975, Plenum Publishing Corp. V. I. Bezuglyi: "Drum Type Developing Machine for Photochemical Processing and Drying of Photographic Materials" pp. 129–131.

*Primary Examiner*—A. A. Mathews
*Attorney, Agent, or Firm*—Parkhurst & Oliff

[57] ABSTRACT

An automatic apparatus for developing photographic or similar films comprising processing tanks arranged in a light impervious compartment in seriatim; an articulated arm pivoted on one end to a base located at the center of the processing tanks and having at its opposite end a member intended to receive the spiral on which the film to be developed is wound; apparatus adapted to impart to said articulated arm angular displacement in order to transfer the spiral from one tank to another and repeated upward and downward movement in order to agitate the spiral in a particular processing tank; and a control programmer for controlling the duration of the movements of the arm.

8 Claims, 5 Drawing Figures

APPARATUS FOR DEVELOPING FILMS HAVING A PIVOTABLE ARM

BACKGROUND OF THE INVENTION

The present invention concerns an automatic apparatus for developing photographic films or the like, particularly color films.

Until now, generally the development of color photographs has required recourse to specialized centers which are unwieldly, bulky and costly; often resulting in delays of about 24 hours, and which do not permit economic development as soon as each film is ready for processing.

Although automatic apparatus for the development of films have previously been proposed (see for example the Journal of Applied Spectroscopy, Vol. 18, No. 1, 1975, pages 129–131, and U.S. Pat. Nos. 1,794,996, 2,975,695, and 3,494,273), none of such solutions are adapted to color film processing and they do not permit instantaneous service.

A device for the processing of black and while films is disclosed in U.S. Pat. No. 3,443,503 which consists of:

a plurality of treatment tanks arranged in a ring within a light-tight box, a film-holder arm which is continuously rotated having a base which is arranged at the center of the ring, a first cam path on which said arm rests adapted to advance the film within a treatment tank and to pass it into the next tank, and a second undulated cam path adapted to agitate the film in a given tank.

However, the above device is for the development of black and white films such as dental negatives and cannot be readily used for the development of color films since: (1) the agitation imparted by the second cam path is definitely insufficient to permit an effective renewal of the bath which becomes depleted or ineffective after contact with the films during the course of the development; and (2) since the arm turns continuously, the angular displacement of this arm (which allows passage from one tank to the next) and the agitation of this arm in a given tank are simultaneous. This second drawback results in an invariable operating cycle and as a consequence, it is not possible to take into account the speed of the films to be treated unless large and bulky tanks are used to permit a variable time of stay from one tank to the next.

A similar type of apparatus is disclosed in U.S. Pat. No. 2,927,521 wherein a plurality of film-holder arms are lifted in order to provide passage from one tank to the next by means of a horizontal cam which is rotated continuously by a motor associated with a turntable and an upright bearing the film-holder arms. This device is also unsuitable for the development of color films since the agitation is insufficient and the cycle is invariable.

A further drawback encountered in utilizing the devices disclosed in the above U.S. Pat. Nos. 3,443,502 and 2,927,521 is that development of films wound on special spools known as "spirals" (whereby the film is wound spirally from the outside towards the inside), is scarcely conceivable without incurring rapid wear of the various moving mechanisms.

BRIEF SUMMARY OF THE INVENTION

The present invention which concerns an automatic developer for photographic films, or the like, overcomes the drawbacks of prior art devices, permits the operator to work in broad daylight, and provides instantaneous service.

Since the present invention is of very simple operation, it is suitable for nonprofessionals and its operation does not require any extensive training.

The automatic apparatus of the present invention provides development of photographic or similar films (particularly color films), and comprises:

a plurality of processing tanks arranged in a ring within a light-impervious box;

an arm articulated at its base, arranged at the center of the ring formed by the said tanks and having a member at its free end for receiving the "spiral" on which the film to be developed is wound; and a motor comprising a shaft which rotates a horizontal cam having a ramp against which abuts a first end of a vertical push rod; the opposite end of said vertical push rod abuts against the movable arm in the vicinity of its pivot pin to thereby drive the movable arm in a vertical direction.

Of particular interest is the fact that the upper part of the above horizontal cam has an eccentric vertical crank pin adapted to cooperate with an element having Maltese cross configuration which is loosely mounted on the vertical push rod and rigidly connected with the attachment base of the articulated end of the movable arm. The Maltese cross element has a number of equidistant arms equal to the number of processing tanks. Engagement of the vertical crank pin with the Maltese cross element causes the arm to move from one tank to the next.

Advantageously, the horizontal cam is provided on its horizontal upper face with a vertical lunule whose center coincides with the axis of rotation of the motor and whose external curvature corresponds to the curvature of the ends of the arms of the Maltese cross element. Furthermore, on the edge of its ascending ramp this horizontal cam has a vertical notch intended to cooperate with diametrically opposite microswitches which are intended to reverse the direction of rotation of the motor and, consequently, the upward and downward movement of the movable arm. These microswitches have contact rollers whose curvature corresponds to the curvature of a vertical notch cut into the edge of the horizontal cam.

Yet another feature of the present invention is a light impervious processing compartment containing the processing tanks which is preceded in known manner by another compartment known as the handling or manipulation compartment, which is also light impervious and is connected to the light impervious processing compartment by light-impervious flexible sleeves. The operator handles the film within the compartments by inserting his arms into the flexible sleeves, a light-tight flexible screen being arranged between the two compartments to assure the imperviousness to light of the assembly. Furthermore, the two light-impervious processing and manipulation compartments are covered by a single cover, hinged at one edge, equipped with a safety device intended to prevent the unintentional opening of this cover when the developing cycle is taking place.

In brief, the apparatus of the present invention is characterized essentially by the combination of: a rotary horizontal cam which permits repeated, vertical agitating movement of the spiral-holder arm in a programmed manner, thus avoiding depletion of the bath at the level of the spiral during the development; and a Maltese cross rigidly connected with the attachment base of the arm and cooperating with the horizontal cam which is rotated by a motor, so as to permit the passage of the spiral-holder arm from one tank to the other when the processing in former tank is completed.

Thus, the phases of agitation of the arm in a given tank and angular displacement of this arm from one tank to the other are independent and separated, which is not possible with known prior art devices.

BRIEF DESCRIPTION OF THE DRAWINGS

The manner of implementing the inventionand the ensuing advantages will be better understood in relation to the following illustrative example and the attached figures, without thereby implying any limitation.

DETAILED DESCRIPTION

Figure 1:
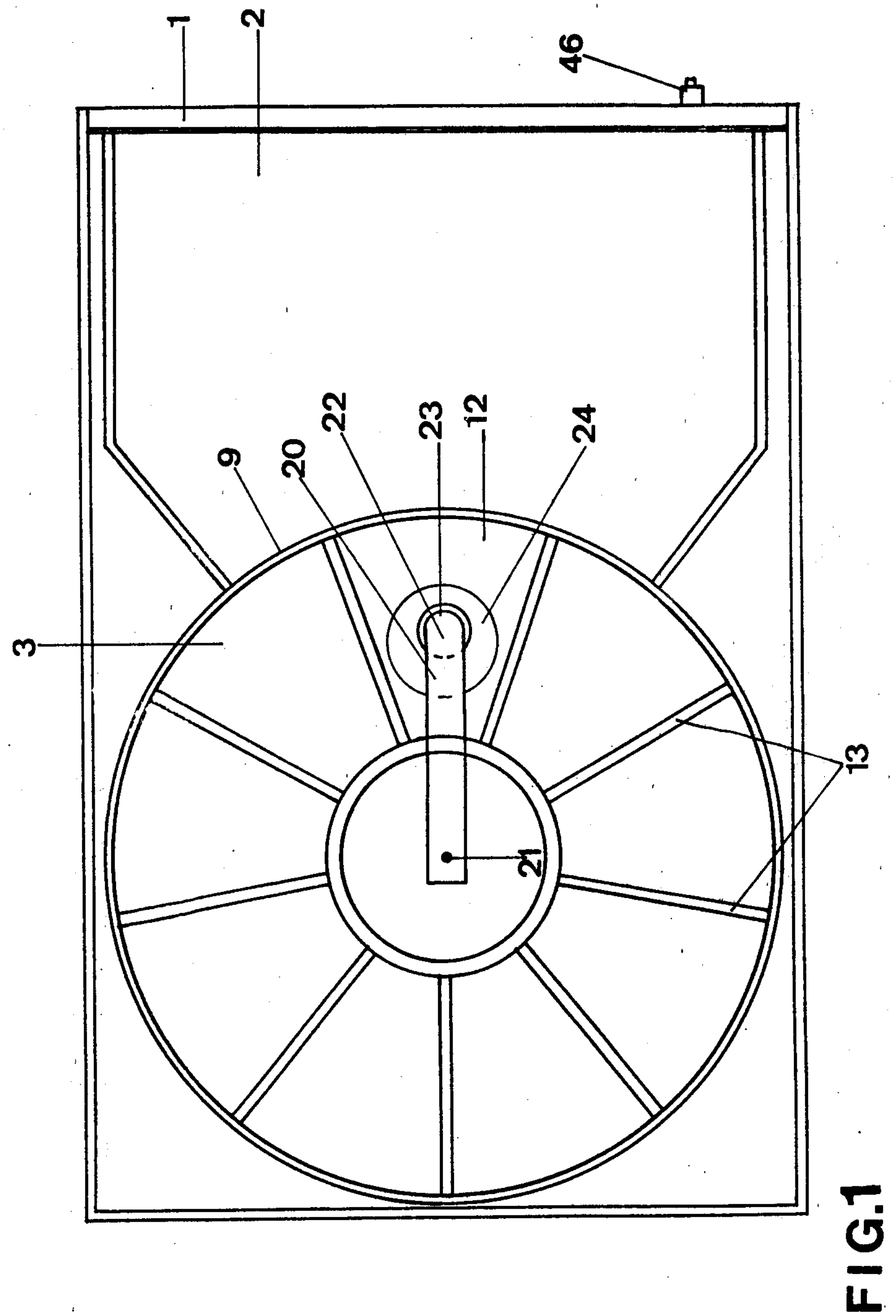
FIG. 1 is a plan view of a developing apparatus according to the invention.
Figure 2:
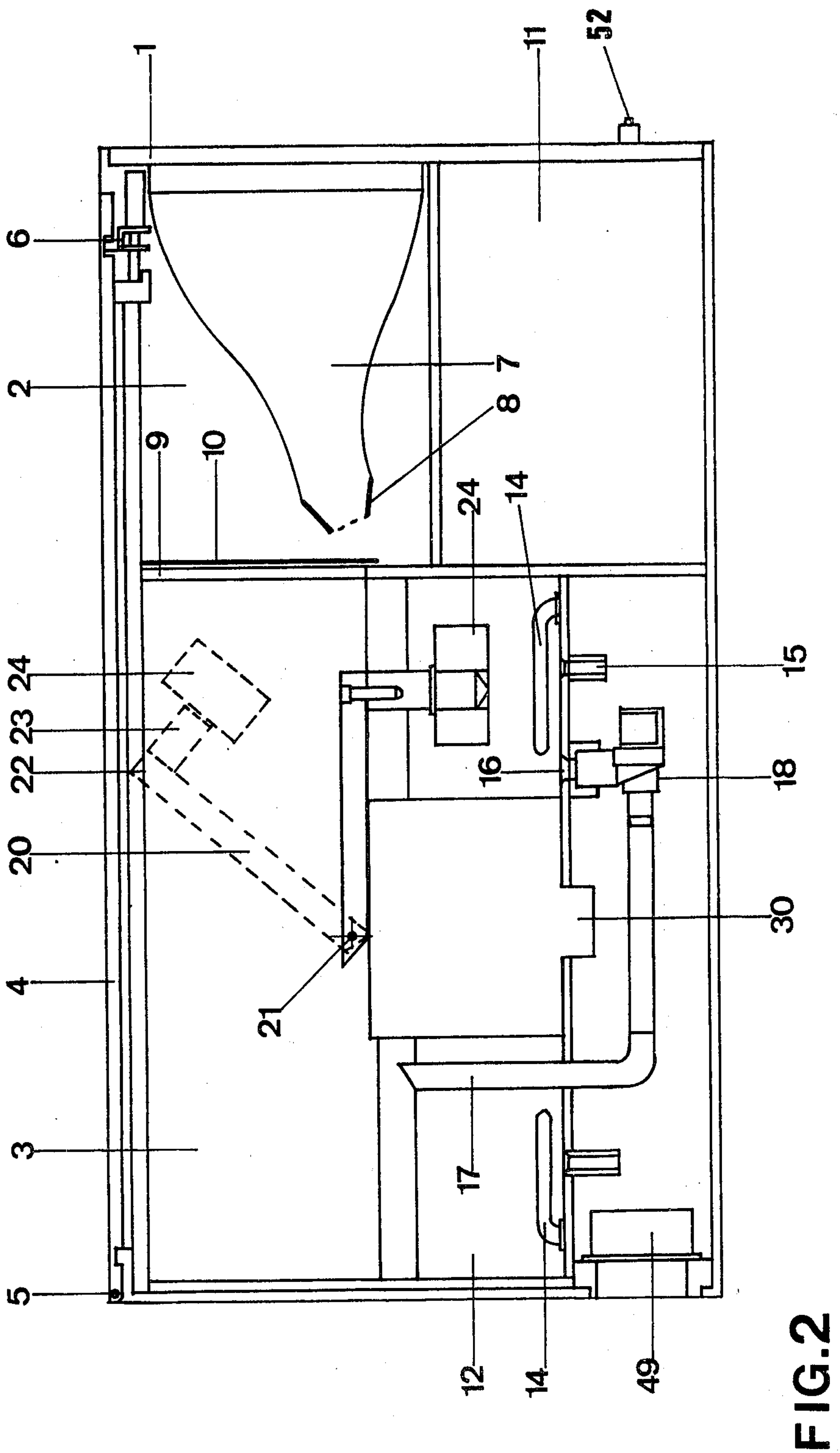
FIG. 2 is a sectional view of the embodiment illustrated in FIG. 1.

Referring to FIGS. 1 and 2, the automatic development apparatus of the invention comprises a box 1 of molded plastic, e.g. PVC or polypropylene, formed of two light-impervious compartments, a manipulation compartment 2 and a processing compartment 3. The compartments 2,3 are closed by a single cover 4 which is hinged by hinge 5 and locked against unintentional opening during the processing by a safety latch 6.

The manipulation compartment 2 has two flexible sleeves 7 located on its front face. Flexible sleeves 7, which may be made of an ordinary coated black thick fabric, have at their ends elastic cuffs 8, which are adapted to receive the two forearms of the manipulator. Compartment 2, which is separated from compartment 3 by partition 9, has a heavy but flexible screen 10 on partition 9. Flexible screen 10 may be a sheet of PVC filled with carbon black in order to assure the imperviousness to light of the unit.

As seen in FIG. 2, the electric drive compartment 11 is located below the manipulation compartment 2.

The processing compartment 3 includes, as is known in the art, an assembly of several unit tanks 12 (nine tanks being illustrated in FIG. 1) arranged side by side on a circular ring, separated by partitions 13. The assembly is also formed of molded plastic. Referring now to FIG. 2, each tank is provided in a known manner on its bottom with an electric heating resistor 14, a liquid inlet 15, a drainage orifice 16, which may be optionally connected to an overflow 17, and a solenoid valve 18 for providing discharge to a sewer.

In the center of the compartment 3, and more precisely of the tanks 12, there is provided a movable arm 20 articulated at a lower end 21 and having at its other free end 22 a perpendicular spiral-holder shaft 23 on which, through a process resembling pinching a spiral 24 is fastened, which is made of stainless steel or plastic, and may or may not be removable and of a type known in the art for this use. The film to be developed winds in known manner in an Archimedes spiral from the outside to the inside of spiral 24.

In the embodiment shown in FIGS. 1 and 2 for the development of color films the nine treatment tanks 12 contain the conventional treatment baths; namely (in clockwise order): the developer; the washing; the inversion (which provides the transfer of the negative image into a positive image); the color developer; the conditioner; the bleaching; the fixing; the washing; and the stabilizer.

Figure 3:
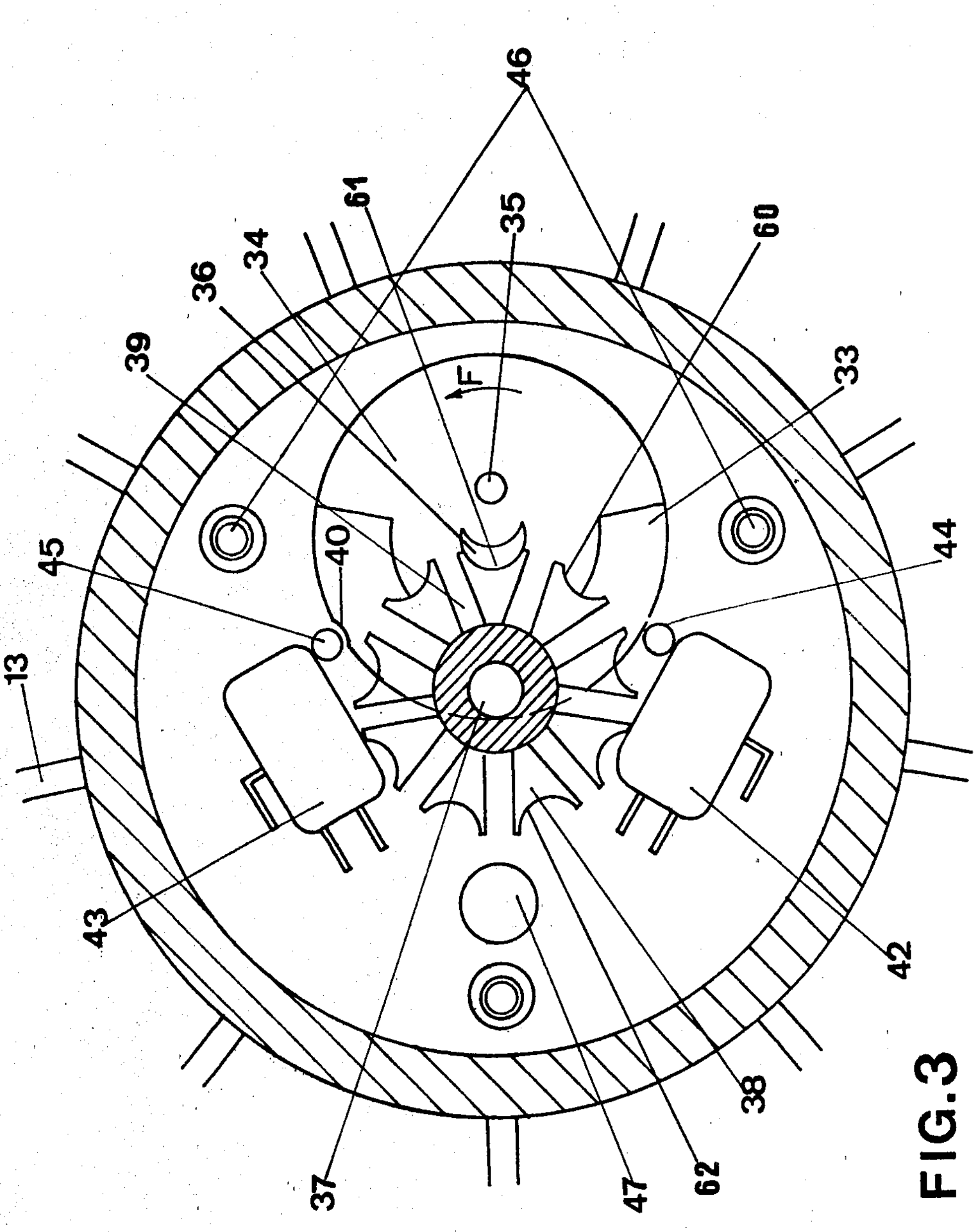
FIG. 3 is a sectional view of the embodiment illustrated in FIG. 1 depicting a top view of the means for moving the movable arm.
Figure 4:
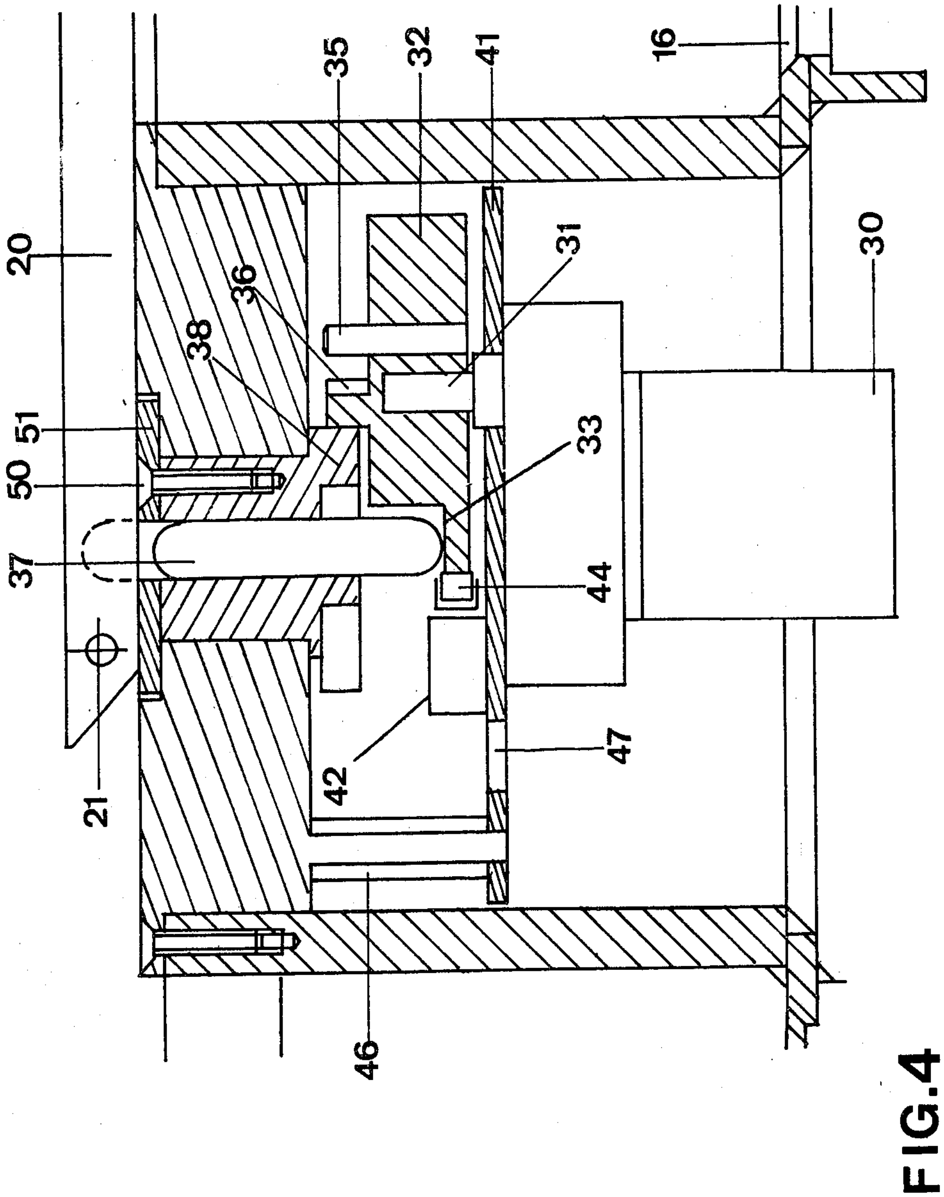
FIG. 4 is a partial cross sectional view of the embodiment of FIG. 1 revealing the means for moving the movable arm.
Figure 5:
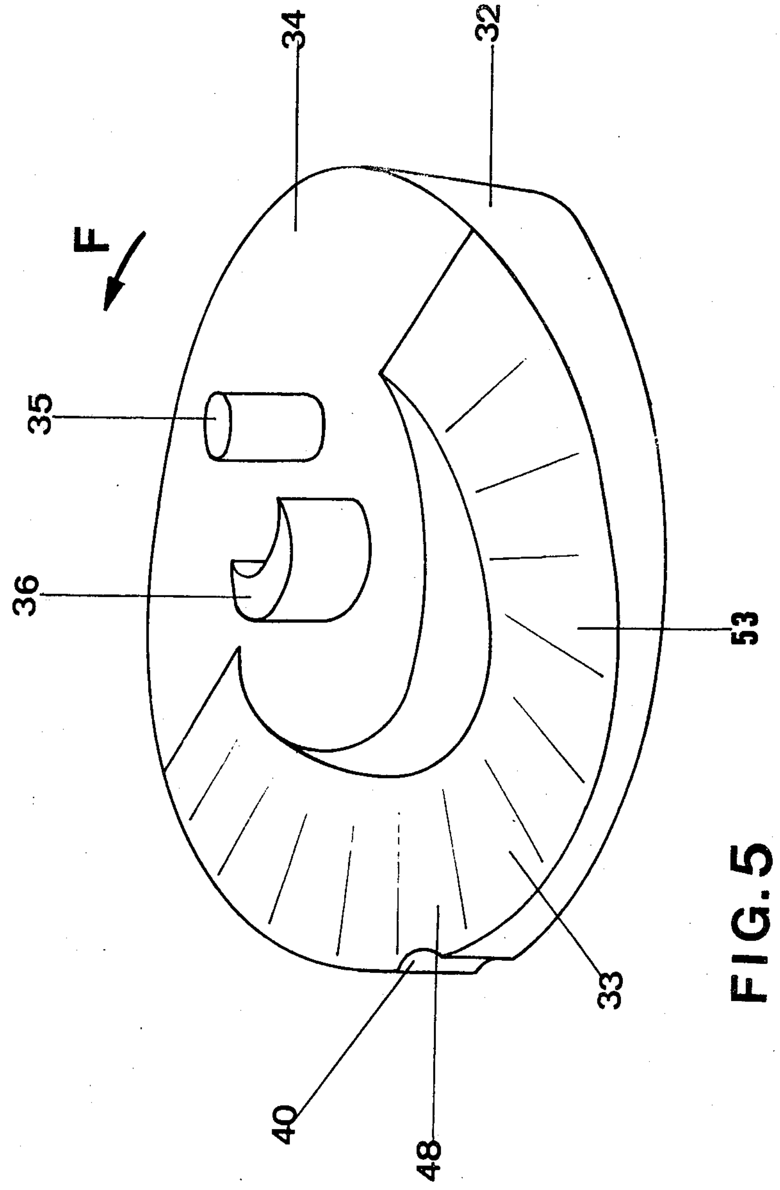
FIG. 5 is a perspective view of the cam which drives the upward and downward movement of the arm.

Referring now to FIGS. 3 and 4, the means for driving arm 20 comprises:

a motor-reducer 30, which may be, for example, a direct current motor reducer, having a vertical rotary shaft 31 on which there is mounted a horizontal cam 32, (as shown in FIG. 5) which has a bell-shaped ramp 33 and a flat 34 having mounted thereon an eccentric vertical crank pin 35 and a vertical lunule 36, the axis of which coincides with the rotary shaft 31;

a vertically movable push rod 37 having lower and upper rounded ends, the lower end resting against the ramp 33 and the upper end being positioned underneath arm 20 in the vicinity of the pivoting means; and a horizontal Maltese cross 38 loosely mounted on push rod 37 (shown in FIG. 3) having arms 60 (nine arms are shown in FIG. 3 since there are nine tanks 12) separated by grooves 39 with parallel edges.

As is readily understood by those skilled in the art, the eccentric crank pin 35 cooperates with grooves 39, and lunule 36 co-operates with corresponding sectors located at the ends of each of the arms of the Maltese cross 38.

All of above parts are also made of molded plastic and, in the case of parts subject to wear, such parts can be made of plastic filled with fiberglass.

Referring now to FIG. 4, Maltese cross 38 is fastened by a vertical screw 50 to the horizontal base 51 on which the articulated end 21 of the movable arm 20 is mounted. In addition to the bell-shaped ramp 33 having ascending portion 48 and descending portion 53, horizontal rotating cam 32 has a vertical notch 40 (shown in FIG. 5) located in its edge in the vicinity of the middle of ascending portion 48. As shown in FIG. 4, a horizontal platform 41, which is arranged below the cam 32 and on top of the motor 30, supports two diametrically opposite microswitches 42,43 (shown in FIG. 3) having contact rollers 44,45, respectively. The positioning of microswitch 42 corresponds to the upper position of arm 20 and the positioning of microswitch 43 correponds to its lower position. Note that the curvature of rollers 44,45 corresponds substantially to the curvature of the vertical notch 40.

Referring now to FIGS. 3 and 4, struts 46 and the orifice 47 provide for the passage of the electric control wires. Motor 30 and the microswitches 42,43 are connected by electric wires passing through passageways 47 to a conventional control programmer (not shown) located in the electric control box or compartment 11 and operated either by a battery or from a power line. This printed circuit programmer, with a conventional low-voltage type printed circuit swept by rubbing contacts, transmits information to the motor 30, thereby controlling the various functions during the development cycle.

In operation, when it is desired to develop a film the operator opens the cover 4 and puts the film and a spiral 24 into the compartment 2. After closing cover 4, he places his forearms into the sleeves 7 and then, using his hands, places the film on spiral 24. Although this manual operation is not observed by the operator since it is carried out within a light impervious box, the training required is of an automatic character which is very rapidly learned partially because the operator remains in full daylight.

Once the film has passed onto the spiral 24, i.e. wound from the outside to the inside thereof, the operator removes screen 10 and places the spiral 24 on spiral-holder shaft 23 of articulated arm 20 which is then located to the right most position (as seen in FIG. 1) and in a raised position due to the effect of push rod 37, which is then located on horizontal portion 34 of the rotary cam 32. As was previously stated, the securing of spiral 24 on the spiral holder 23 is effected by simple radial pinching.

Upon completion of the manual positioning operation, the operator removes his arms from the sleeves 7 and pushes a main control button 52 which controls the automatic character of the development operation. The pressing of the button automatically assures the locking of a latch 6 associated with the cover 4. At the start of the cycle, as stated previously, the arm 20 is in a raised position due to the position of push rod 37 which rests against horizontal portion 34.

Upon rotation of motor 30, horizontal cam 32 is rotated in the direction indicated by the arrow F in FIG. 3. Crank pin 35 then engages the adjacent groove 39 located between two arms 60 of Maltese cross 38. Upon moving in said groove 39, the crank pin 35 causes the Maltese cross 38 and, therefore, the assembly including arm 20 to turn 40° (the angular distance between two adjacent arms 60 of Maltese cross 38). Consequently, arm 20 is brought into its upper position just above the first tank 12 containing the developer.

When push rod 37 has arrived at the edge of the horizontal portion 34 of the cam 32, it moves over descending portion 53 of the ramp 33 (shown in FIG. 5). As a result the arm 20 is moved vertically downward. Consequently, arm 20 and therefore spiral 24 descend into the bath in tank 12.

Subsequently push rod 37 rises vertically on the ascending portion 48 of the ramp 33, thus causing the arm 20 to move upward. When the roller 44 associated with the microswitch 42 encounters the vertical notch 40 provided in the cam 32, the rotation of the motor 30 is reversed by the control programmer. The push rod 37 consequently descends along the ramp 48, which again causes the immersion of the arm 20 and the spiral 24 into the bath. In this manner, arm 20 and spiral 24 are driven through ascending and descending movements which cause continuous agitation of the spiral 24 and the film held thereon within the bath contained in the tank 12. Likewise, when the roller 45 of the microswitch 43 encounters the vertical notch 40, the movement is reversed by the control programmer whereupon the cycle is repeated.

The frequency and the duration of this rising and descending movement is dependent on the nature of the film to be developed and the development process and is controlled by the programmer which controls the motor 30.

At the end of movement, the crank pin 35 engages into the following groove 39, which transfers the arm 20 holding spiral 24 to the following tank, whereupon the ascending and descending movement of push rod 37 described above is repeated thereby resuming the agitation. Such operations as described above are repeated until termination at the last tank 12 which contains the stabilizer.

In order to prevent the arm 20 from being able to move laterially when the crank pin 35 is not engaged in a groove 39, the cam 32 has thereon a lunule 36 whose axis coincides with the axis of rotation 31 and whose external curvature 61 coincides with the curvature 62 of the end of the arms 20 of the Maltese cross 38.

At the end of the cycle, the arm 20 remains in upper position; i.e. push rod 37 rests against the horizontal portion 34 of the cam 32, so as to permit removal of the developed spool. In order to do this, the operator opens the cover 4 whereupon the developed spiral can be directly withdrawn in full daylight.

A fan 49 with outer air intake (as shown in FIG. 2) makes it possible to create a vacuum in the assembly consisting of the three compartments 2, 3 and 11 so as to avoid condensation.

By way of illustration, the average time of one development cycle for a color film is fifteen minutes for a negative film, and thirty minutes for a reversal film (slide).

The development device of the invention has numerous advantages over those presently marketed, including simplicity of construction, rapidity of the cycle, and ease of use. The device can be used non-professionally and provides for the possibility of developing films upon demand, and the possibility of modifying the treatment cycle depending on the speed of the films to be developed.

What is claimed is:

1. An automatic apparatus for the development of photographic films comprising:

a plurality of processing tanks arranged in a ring in a light-tight compartment, a rotating base, an arm pivoted to said base arranged in the center of the said ring formed by the tanks and having at its free end a receiving member intended to receive a spool on which the film to be developed is wound, a push rod having a first and second end, a horizontal cam having a ramp portion and a vertical crank pin thereon, a Maltese cross which is loosely mounted on the vertical push rod and rigidly connected to said base, said Maltese cross having a number of equidistant arms equal to the number of processing tanks, a motor whose vertical rotation shaft drives said horizontal cam, said first end of said push rod resting on said ramp portion, said second end resting below the movable arm in the vicinity of said base, said vertical crank pin operating to cooperate with said Maltese cross to rotate said arm in a horizontal direction, said arm being driven in a vertical direction by said push rod.

2. An apparatus for automatic photographic development adapted to be used for the development of a photographic film, comprising:

a light impervious compartment, a plurality of processing tanks arranged within said light impervious compartment in ring-like fashion;

means for providing support located centrally of said processing tanks;

a horizontal base rotatably supported by said supporting means;

an arm having a first end pivotably mounted to said horizontal base and a second end supporting means for receiving a spiral on which a film to be developed is wound;

a motor for imparting movement to said arm supported by said supporting means and positioned under said horizontal base, said motor having a shaft;

a horizontal cam mounted on said shaft, said horizontal cam having a ramp portion and a flat portion;

a vertical push rod having a lower end positioned above said horizontal cam and operating to alternately rest on said ramp and flat portions and an upper end which operatively engages said arm so as to impart vertical movement thereto such that when said horizontal cam is rotated said push rod encounters said ramp portion and is driven in a vertical direction thereby causing said arm to move vertially; such vertical movement operating to cause a film to be immersed into or extracted from one of said processing tanks;

driver means for imparting rotational movement to said horizontal base, said driver means being secured to said horizontal base, a portion of said driver means being formed in the configuration of a Maltese cross having a number of equidistant sections equal to the number of said processing tanks, said horizontal cam having an eccentrically located vertical pin extending therefrom which engages said driver means in order to impart movement thereto such that when said horizontal cam is rotated sufficiently so as to cause said vertical pin to engage said driver means further movement of said horizontal cam operates to rotate said horizontal base to thereby rotate said arm about a vertical axis so that a film may be moved from one tank to another;

whereby said motor may be operated to selectively rotate said horizontal cam to independently impart vertical and rotational movement to said arm to thereby cause a film to be selectively moved vertically within one of said processing tanks or from one tank to another as it proceeds through a development cycle.

3. The apparatus of claim 2, wherein said horizontal cam has a vertical lunule mounted thereon whose center coincides with the axis of rotation of the motor, said lunule having an external curvature and said Maltese cross portion of said driver means having a corresponding curvature at the end of said equidistant sections such that said driver means is held by said lunule during a portion of the rotational movement of said horizontal cam.

4. The apparatus of claim 1, 2 or 3 further including microswitches and wherein said ramp portion of said horizontal cam includes an ascending ramp segment having associated therewith a vertical notch intended to cooperate with diametrically opposite microswitches intended to reverse the direction of the rotation of the motor and therefore cause the upward and downward movement of said arm.

5. The apparatus of claim 4, wherein said microswitches have contact rollers whose curvatures correspond to the curvature of said vertical notch.

6. The apparatus of claim 2 further comprising a manipulation compartment comprising a plurality of light impervious flexible sleeves and a light impervious flexible screen and wherein said light impervious compartment containing said processing tanks is adjacent said manipulation compartment, said light impervious compartment being shielded from said manipulation compartment by said light impervious flexible sleeves and wherein said light impervious flexible screen is arranged between said manipulation compartment and said light impervious compartment in order to assure the light imperviousness.

7. The apparatus of claim 6 wherein said light impervious compartment and said manipulation compartment are covered by a single cover hinged on one edge, said cover being equipped with a safety means intended to prevent its undesired opening during the development cycle.

8. An automatic photographic development apparatus for the development of photographic materials comprising:

means forming a light impervious compartment;

supporting means for providing support located within said compartment means;

a plurality of processing tanks arranged around said supporting means;

means forming a base rotatably supported by said supporting means;

an arm having a first portion pivotably mounted to said base means and a second portion having receiving means positioned thereon for receiving a photographic material;

motor means for imparting motion to said arm supported by supporting means and positioned under said base means; said motor means comprising a rotatable shaft;

cam means for transferring motion mounted on said shaft, said cam means having a first section for transmitting rotational movement and a second section for transmitting vertical movement;

a push rod having a lower end which operatively engages said second section of said cam means and an upper end which operatively engages said arm such that the vertical movement is transferred to said arm by said push rod from said second section of said cam means upon rotation of said motor means; and driver means connected to said base means for imparting rotational movement to said base means and said arm, said first section of said cam means having an eccentrically located protrusion which engages said driver means to impart rotational movement thereto, said cam means operating to impart rotational movement to said arm during a first part of its rotational movement and impart vertical movement to said arm during a second part of its rotational movement such that said arm may be selectively rotated or moved vertically depending upon the rotational movement of said cam means;

whereby said arm may be selectively and independently moved vertically to immerse a photographic material into one of said processing tanks and rotated to move said arm to another tank such that a photographic material may be developed as said arm moves the photographic material vertically within selected tanks and from one tank to another.

* * * * *